May 3, 1932.  W. STOECKICHT  1,856,443
BEVEL WHEEL GEARING
Filed June 10, 1927
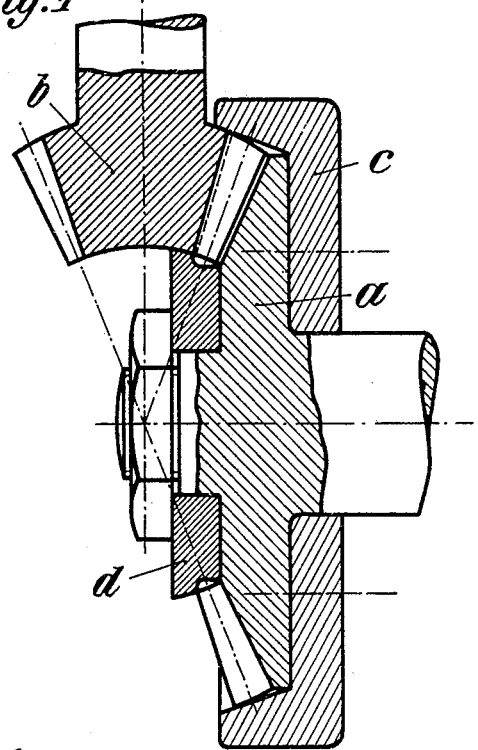
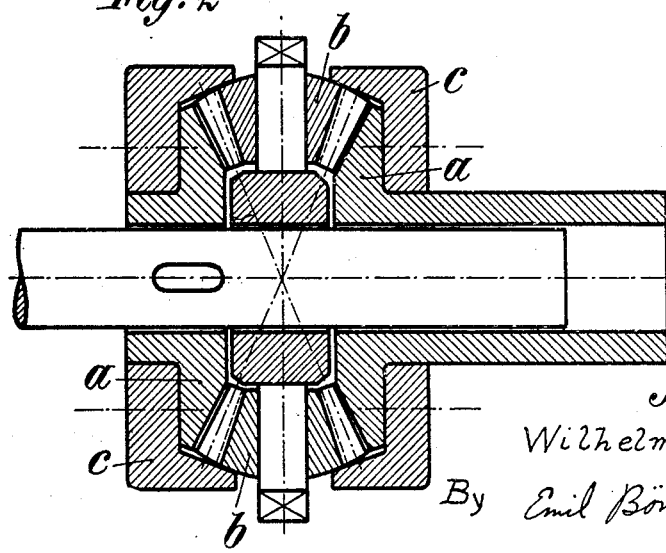
Inventor:
Wilhelm Stoeckicht
By Emil Bönnelyche
Attorney Patented May 3, 1932

1,856,443

UNITED STATES PATENT OFFICE

WILHELM STOECKICHT, OF MUNICH-SOLLN, GERMANY

BEVEL-WHEEL GEARING

Application filed June 10, 1927, Serial No. 197,900, and in Germany June 19, 1926.

This invention relates in general to the known bevel-wheel gearings. More particularly, it relates to means for simplifying bevel-wheel gearings and reducing the cost-price thereof. I attain these objects by so designing the bevel-wheels that an axle thrust bearing can be dispensed with. The most favorable case is, of course, that in which no wheel of a bevel-wheel gearing requires an axle thrust bearing, but there are many cases in which it is sufficient that a bearing of this kind is dispensed with, with only one of the wheels of a pair.

The invention consists therein that one of the two wheels of a pair of bevel-wheels is provided with collars connected rigidly either with the respective wheel itself or with its shaft, and extending at and with their peripheries over the adjacent portions of the other wheel of the pair, i. e. at the outer and inner ends of the teeth just meshing with the teeth of the wheel provided with said collars, there being attained thereby a type of coupling of the two wheels which prevents either wheel from being withdrawn axially from the other one, and the two wheels being therefore, continually in the proper position and relation to each other.

The contact between the surfaces of the one bevel-wheel at the frontal ends of the bevel-teeth and the surfaces of the collars takes place best in the point of contact of the dividing circles of the wheels, that is to say, in that point in which the dividing circles roll round one another. In this case the axle-pressures are taken up, and the friction-work accompanying it, proceeds practically free of loss. The surfaces of the collars and those of the other bevel-wheel which contact with said collar surfaces are preferably so designed that the places of contact approach the point-contact as much as possible. It is a fundamental truth that an actual point contact in the mathematical sense can never occur; even in the case of a theoretical point contact, there will arise an elastic distortion and, therefore, a small surface of contact. A difference between point-contact and contact on a small surface cannot practically be made. In order to attain this, the surfaces mentioned are designed at the bevel-wheel and at the collars preferably either as circular or as spherical surfaces.

It will be advantageous to proceed in this way, that in the case of spherical surfaces, the radius of the sphere of the one surface of contact is smaller than the radius of the other sphere which contacts with the first. The surface of the other collar may be designed conically, if desired, which is more favorable for the unmistakable determination of the point of contact, as well as for the manufacture. The same is true of course, also for the surface of the inner collar. But here it may be more suited to the purpose to design the collar circularly and the bevel-wheel conically.

The invention is illustrated diagrammatically and by way of example on the accompanying drawings on which Figure 1 is an axial section through one constructional form of the gearing, and Figure 2 is a similar representation showing a modification.

On the drawing, $a$, Fig. 1, denotes the larger of the two bevel-wheels and $b$ the smaller thereof. The wheel $a$ is combined with the large collar $c$ and the small collar $d$. In the modification Fig. 2 the small collars are dispensed with, as this gearing is a planet-wheel gearing. The axle thrust bearings can be saved in this case.

In Fig. 1 the surfaces of contact at the small wheel $b$ are designed as circularly curved surfaces, as are also the surfaces of contact at the inner collar $d$, whereas the surfaces of contact at the outer collar $c$ are designed as conical surfaces. In Fig. 2 contact takes place only between the outer surfaces of the small bevel-wheels $b$ and the surfaces of the outer collars $c$. The outer surface of each of the wheels $b$ is designed as a spherical surface and that of each of the collars as a conical one.

The manner of action is as follows: The axle forces arising in the bevel-wheels when the gearing is in operation cause the small bevel-wheels to contact intimately with the collars which take up the axle forces, in consequence whereof separate axle thrust bearings for the bevel-wheels can be dispensed with. Furthermore, the bevel-wheels are adjusted automatically by the collars as regards their proper axial position, that adjustment being, in fact, very accurate. While with bevel-wheel gearings that are subjected to severe strain, as with the rear axle drive of motor-vehicles, the accurate adjustment of the bevel-wheels is impaired by the deformations arising, especially those of the casing, the present invention warrants always an accurate adjustment in a perfectly automatic manner.

The axle pressures are taken up practically without loss, in that the collars roll round in very close proximity to the dividing circle. The rolling round can be caused to take place also in the dividing circle itself, in which case it is suited to the purpose to attach caps to the rolling-round bevel-wheel.

The invention is particularly important for bevel-wheels with oblique or screw-thread shaped teeth in which arise often times very high axle-pressures, the direction of which changes.

I claim:

1. A bevel-wheel gearing, comprising, in combination with one of the wheels of the gearings, a collar located at the outer surface of the same and another collar located at the inner surface of the same, both collars engaging the other wheel in such a manner that axial shifting of both wheels is prevented.

2. A bevel-wheel gearing, comprising, in combination with one of the wheels of the gearings, a collar located at the outer surface of the same and another collar located at the inner surface of the same, both collars engaging the other wheel in such a manner that axial shifting of both wheels is prevented, the surfaces of contact between said collars and the wheel engaged by them being designed as curved surfaces.

In testimony whereof I affix my signature.

WILHELM STOECKICHT.